March 22, 1927.
D. GRIMES
ALTERNATING CURRENT RELAY
Filed Dec. 29, 1921
1,621,533
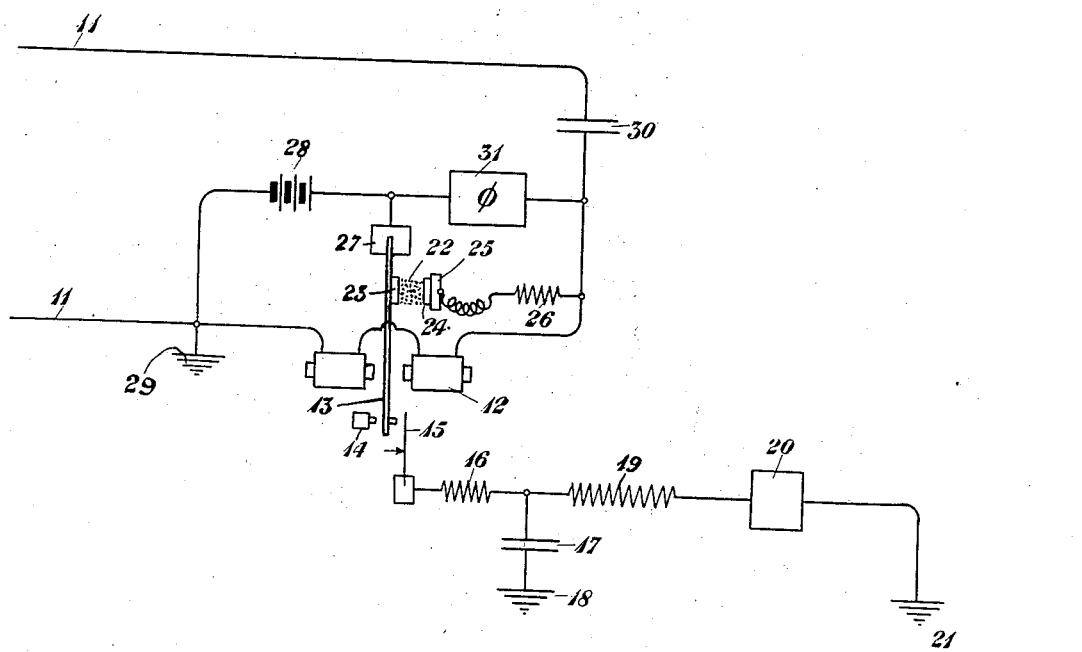
INVENTOR
D. Grimes
BY
ATTORNEY Patented Mar. 22, 1927.

1,621,533

UNITED STATES PATENT OFFICE.

DAVID GRIMES, OF TOMPKINSVILLE, NEW YORK, ASSIGNOR TO AMERICAN TELEPHONE AND TELEGRAPH COMPANY, A CORPORATION OF NEW YORK.

ALTERNATING-CURRENT RELAY.

Application filed December 29, 1921. Serial No. 525,726.

The principal object of my invention is to provide a new and improved relay adapted to respond selectively to feeble alternating currents of a particular frequency. Another object of my invention is to provide a relay adapted to actuate a ringer on attenuated alternating currents of frequency 135 cycles per second as received over long telephone lines. Still another object of my invention is to provide a "feed-back system" by which energy may be supplied from a local battery to intensify the vibration of a tuned reed in an alternating current relay. These objects and other objects of my invention will become apparent upon consideration of a specific example which I have illustrated in the accompanying drawings and which I will now proceed to describe in the following specification. It will be understood that the invention is defined in the appended claims.

Proceeding to a description of the relay as shown in the drawing, the conductors 11 bring the signaling current of 135 cycles frequency per second from a long telephone line to the magnet coils 12. The alternating magnetic flux generated thereby acts upon the tuned polarized reed 13 tending to make it vibrate. At the end of the reed on one side is a stop 14 and on the other side a contact 15 from which a partial circuit may be traced through the resistance 16 and condenser 17 to ground 18. Branching from this circuit at a point between the resistance 16 and the condenser 17 is a branch circuit through the resistance 19 and device 20 to ground 21.

A microphonic device, consisting of powdered carbon 22 between the plates 23 and 24, has one of its plates 23 fixed on the reed 13 near its base. The other plate 24 is attached to the member 25, which may be either a fixed support or a free inertia support. From the member 25 there is a conductive connection through a resistance 26 to one side of the line 11.

From the block 27, which supports the reed 13, there is a conductive connection through the battery 28 to the other side of the line 11, which is grounded at 29. The condenser 30 is interposed in the side of the line connected to the resistance 26. 31 is a phase shifter, by which the phase relation may be adjusted between the resistance variations in element 22 and the current variations in winding 12.

Alternating current coming in over the line 11 passes through the windings 12, and, if of proper frequency, sets the reed 13 in vibration. The vibration of the reed 13 varies the pressure on the carbon granules 22 and thus varies the resistance of the circuit of battery 28, this circuit being traced as follows: 28—27—13—23—22—24—25—26—12. A condenser 30 is provided to keep the current from battery 28 off the line.

When the resistance of the microphonic element 22 is unvarying, the current from the batery 28 in the coils 12 produces a stress on the polarized reed 13, but no vibration. But the variation of resistance of 22 varies the current from battery 28 to the coils 12, and this variation is in such phase relation with the alternating current coming in over the line 11, that the action of the magnets 12 on the reed 13 is accentuated. Hence it will be seen that an initial vibration caused by the alternating current coming in over the line 11 causes a "feed back" variation of energy from the battery 28 that builds up the vibration of the reed 13.

This vibration of the reed 13 causes it intermittently to make contact with the member 15. When a contact is made in this way the condenser 17 is charged through a circuit traced as follows: 29—28—27—13—15—16—17—18. Such charge will be completed during the period of contact between the reed 13 and the member 15. A discharge current from the condenser 17 will then pass through the resistance 19 and device 20 to ground 21. This will build up so slowly that it will not be of considerable magnitude at the time the contact is broken at 13—15, but the discharge will be practically completed by the time this contact is made again.

Thus the condenser 17 will be charged 135 times per second and discharged as often through the device 20. The integrated current from the condenser 17 through the device 20 at this frequency of 135 cycles per second will be sufficient to actuate the device 20.

The microphonic button 23—22—24 should be attached near the base end of the reed where it will have very little damping effect. However, in so far as it tends to damp the vibration of the reed, this effect will be more than compensated by the feed-back of local energy. Of course the mounting of the button on the reed may change the natural frequency of the reed, but the dimensions of the reed may then be adjusted so as to give it the desired frequency when it carries the button.

What is claimed is:

1. In an alternating current relay a local source of energy and means governed by the relay armature to apply this energy to the armature in phase with incoming energy to the relay.

2. In an alternating current relay of the vibratory reed type, a local source of energy, means to apply such energy to exert a vibratory tendency on the reed, and a device attached to the reed to control said means.

3. In an alternating current relay of the vibratory reed type, a local battery, a microphonic element associated with the reed and in circuit with the battery, and means to apply the battery current controlled thereby to accentuate vibration of the reed.

4. An alternating current relay of the vibratory reed type, a telephone line connected with its magnet windings, and a local battery also connected therewith, the latter connection comprising a microphonic contact associated with the reed and a phase adjustor to make the local battery energy coincide in effect on the said reed with current of appropriate frequency to the reed received on said telephone line.

5. In an alternating current relay of the vibratory reed type, a local battery, a microphonic button mounted on the reed and in circuit with the battery, and circuit connections to put the battery current controlled by the button through the relay in superposition to the normal line current therethrough.

In testimony whereof, I have signed my name to this specification this 28th day of December, 1921.

DAVID GRIMES.